United States Patent [19]

Mikhail

[11] 4,404,100
[45] Sep. 13, 1983

[54] HEMODIALYZER WITH PLEATED MEMBRANE

[75] Inventor: Adel A. Mikhail, Bloomington, Minn.

[73] Assignee: Medical Incorporated, Inver Grove Heights, Minn.

[21] Appl. No.: 374,973

[22] Filed: May 5, 1982

Related U.S. Application Data

[63] Continuation of Ser. No. 149,303, May 13, 1980, abandoned.

[51] Int. Cl.³ .............................................. B01D 31/00
[52] U.S. Cl. ................................. 210/232; 210/321.3
[58] Field of Search ................... 210/493.1, 321.3, 232

[56] References Cited

U.S. PATENT DOCUMENTS 3,864,265  2/1975  Markley ........................... 210/321.3
3,979,295  9/1976  Markley ........................... 210/321.3
4,165,287  8/1979  Goyne ................................ 210/232
4,238,340 12/1980  Markley et al. ................. 210/321.3

Primary Examiner—Frank A. Spear, Jr.
Attorney, Agent, or Firm—Beehler, Pavitt, Siegemund, Jagger & Martella

[57] ABSTRACT

A hemodialyzer having a reinforced blood side case half and a reinforced dialysate side case half, said case halves having generally trapezoidal cross sections with the longer sides being open and joinable together in the assembled form along a parting line. Wedge elements extending within said case halves positioned with their apexes at said parting line. The base walls of the wedges and case halves define together a generally rectangular cavity in which a stack of pleated cofolded semipermeable membrane and dialysate permeable separator is positioned. The last pleat of the membrane on either side of the stack extends over the end of the adjacent wedge element on the blood side and is trapped and adhesively sealed between the side walls of the blood side case half and the coextending wall of the wedge element. The dialysate side of the stack is sealed to the base wall of the dialysate side case half by a non-adherent solid preformed body of resilient elastomeric material. The coextending wedge element and case half sides are contoured so as to permit accurate measurement and positioning of initially flowable curable in situ adhesive.

11 Claims, 7 Drawing Figures

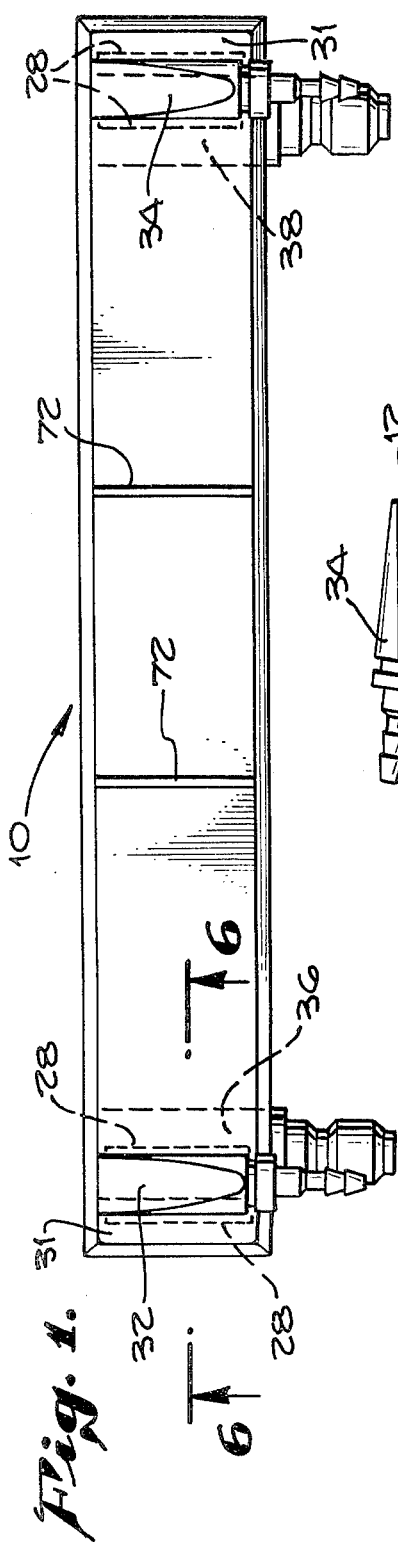
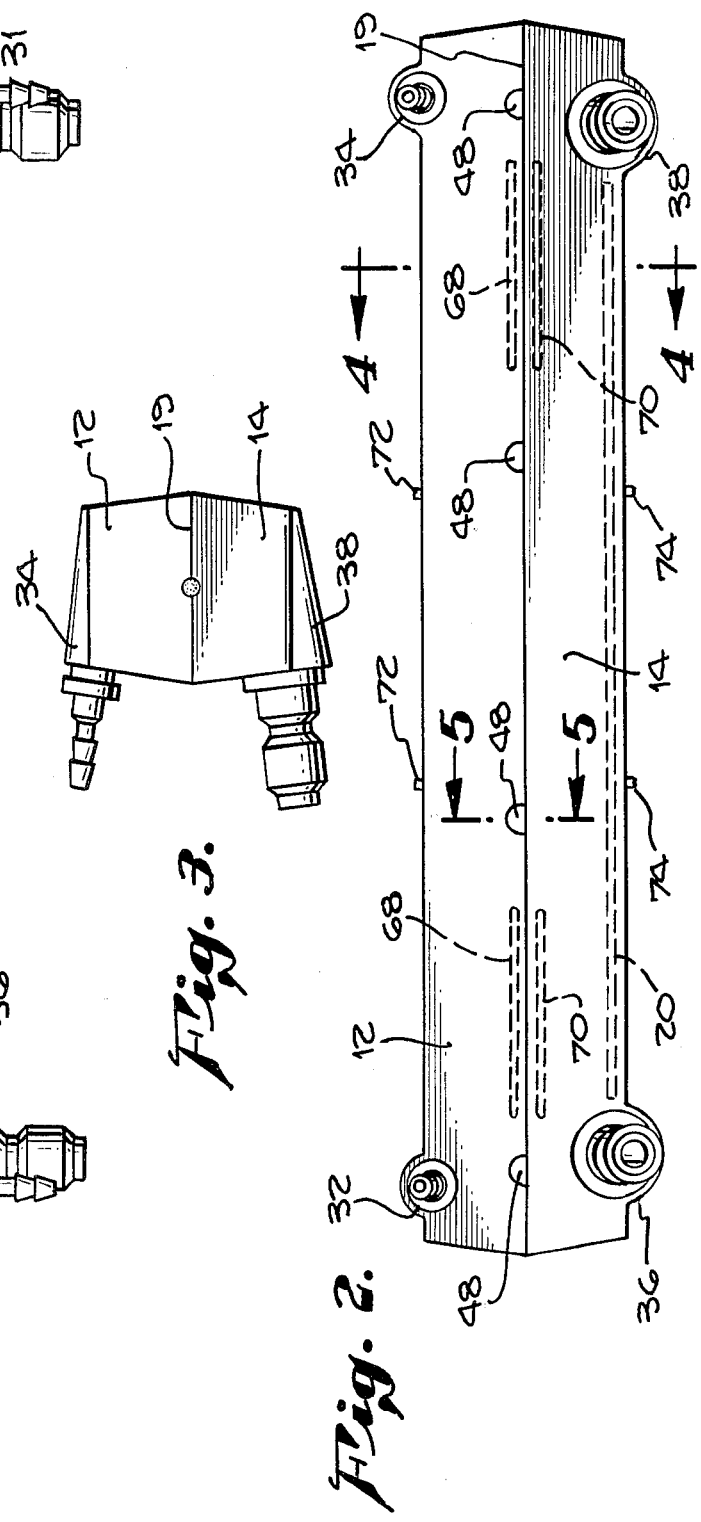

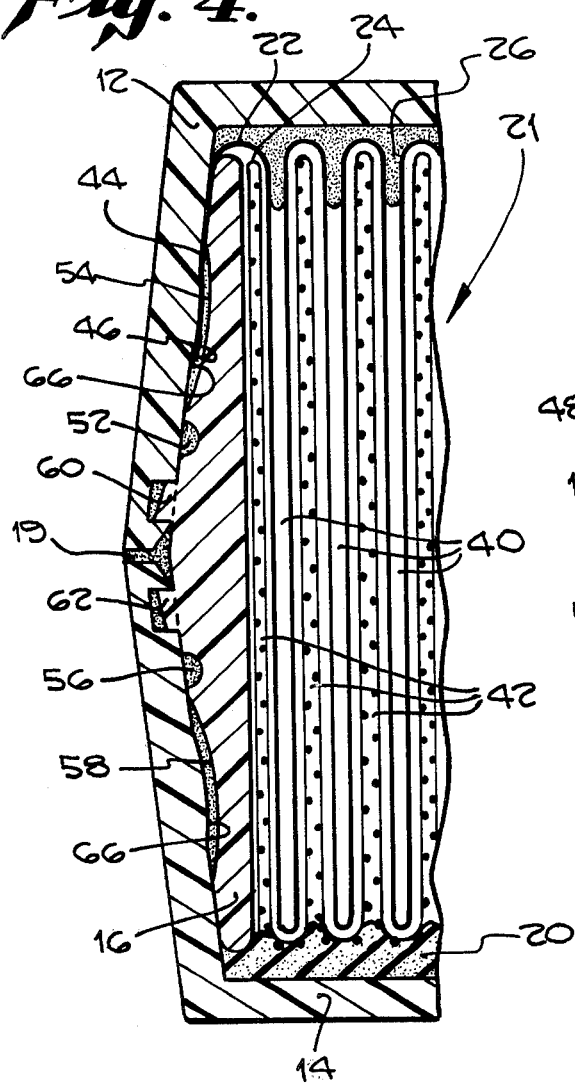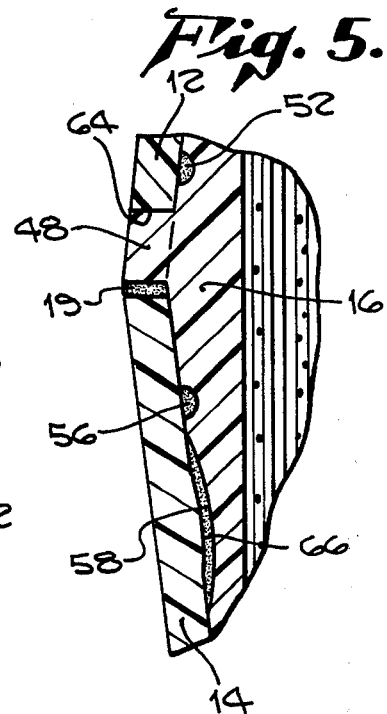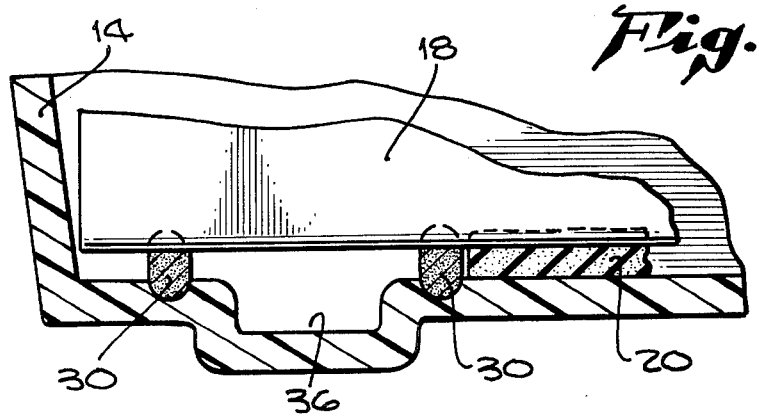

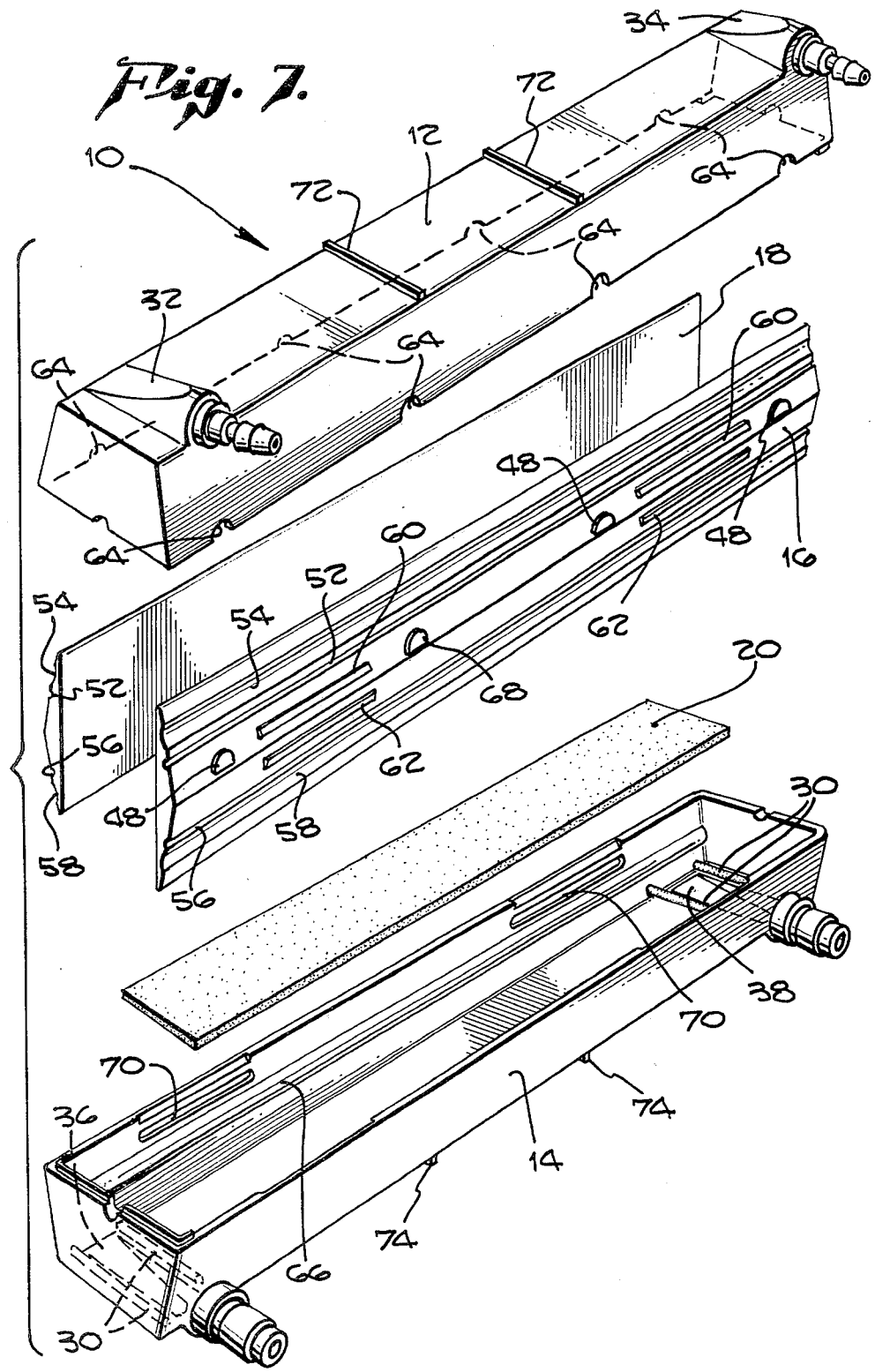

HEMODIALYZER WITH PLEATED MEMBRANE

This is a continuation of application Ser. No. 149,303, filed May 13, 1980, now abandoned.

This invention relates to parallel plate hemodialyzers in which a semipermeable membrane is pleated and confined within a case to define a plurality of parallel blood and dialysate channels which are operated under countercurrent flow conditions.

Previously considerable difficulty had been experienced in obtaining satisfactory operating characteristics for certain types of folded membrane hemodialyzers. Previously erratic operating characteristics, high clinical incidence, extreme or unusual operating requirements and the like had resulted in less than completely satisfactory results from the use of certain prior hemodialyzers. These and other difficulties of the prior art have been overcome according to the present invention.

According to the present invention a parallel plate pleated membrane hemodialyzer is provided which has a very low leak incidence, reproducable operating characteristics from one mass produced unit to another, very desirable clearance rates, and which is very simple and efficient to use. Devices according to the present invention are readily manufacturable and are usable with conventional dialysate delivery machines without special modifications or procedures. In general the devices according to the present invention include a case or shell which is approximately symmetrical about a parting line. The case halves are generally trapezoidal in configuration with the longer side at the parting line. Wedge shaped elements are provided in the case with their apexes positioned at the parting line and their bases defining two of the sides of a generally rectangular cavity, the angularly extending sides extend coangularly with the sides of the case halves and act wedgedly therewith. A stack of semipermeable membrane is disposed within the generally rectangular cavity. One side of the hemodialyzer is conveniently described as the blood side with the case half on that side being described as the blood side case half. The other side of the hemodialyzer and the other case half are conveniently described as the dialysate side. On the blood side of the hemodialyzer the end of the semipermeable membrane extends over the end of the wedging element on each side of the stack of permeable membrane. This end flap is trapped between the angularly extending wedgedly coacting surfaces of the wedging element and the case. The general configuration is similar to that which is described in the application of Finley W. Markley et al, Ser. No. 35,852, filed May 4, 1979, now U.S. Pat. No. 4,238,340 for HEMODIALYZER.

According to the present invention the wedgedly coacting surfaces of the case halves and the wedging elements are configured so as to insure effective sealing of the flap of membrane as well as to provide an accurate measure, during production, of the amount of adhesive to be used at this location. The edge of the membrane flap is positioned in a cavity which is formed between a valley in one of the wedgedly coacting surfaces and a bump on the other. The cavity is filled with an initially flowable adhesive which cures in situ so as to encapsulate the end of the flap and prevent fluids from flowing from the blood side to the dialysate side of the device around the edge of the flap.

The assembly of the device is greatly facilitated by the presence of various clamping points on the wedging elements. These clamping points are preferably positioned adjacent to the parting line on the blood side of the wedging elements and are accessible through notches in the blood side half of the case even when the device is in its fully assembled configuration. Thus, the stack of semipermeable membrane may be clamped between the wedging elements in a suitable assembly clamping fixture while the blood side case half is assembled with the wedges. The clamping fixtures need not be released until the blood side is fully assembled. Thus, the stack is not subject to distortion or shifting during assembly. This avoids stressing the membrane during assembly which might tear it or prestress it so that it fails during use. It also tends to insure proper positioning of the various elements in the completed device.

During the assembly initially flowable adhesive which is to be cured in situ is applied to the angularly projecting faces of the wedging elements. Proper distribution and measurement of the adhesive is provided by the contour of the angular faces of the wedging elements in cooperation with the coacting angular faces of the case halves. The contours of the angularly extending surfaces of the wedging elements are symmetrical about the apex of the wedging element. On each of the angularly extending faces there is a valley or trough which extends axially for the full length of the surface. The valley is spaced intermediate from and parallel to the apex and the outer edge of the wedging element. The valley or trough is smoothly faired into the wedgedly coacting surface of the wedging element. Intermediate the trough or valley and the apex, and extending parallel therebetween, is a groove or channel which is quite narrow and steep. This groove is adapted to hold and guide an index pin of a scraper. An initially flowable adhesive is applied to the valley or trough and a scraper is then positioned so that an index pin therefor rests in the groove and the straight scraping edge of the scraper bridges across the valley to rest on the generally planer portions of the angularly extending surface of either side of the valley. Drawing the scraper axially for the length of the wedging element causes the adhesive to spread and fill the valley and any excess is scraped off. This can be accomplished while the dialyzing stack is clamped in the assembly clamping fixture so that there is no need to handle or move the stack and wedging elements once application of the adhesive has begun.

The mating angular surfaces of the case halves are provided with bumps which mate with but are somewhat smaller than the valleys on the wedging elements. Being somewhat smaller than the valleys, the bumps during assembly displace some but not all of the adhesive from the valleys. This adhesive flows along the juncture between the wedgedly coacting surfaces towards the apex of the wedging elements. The size of the bumps, which extend throughout the full length of the valleys, determines how much adhesive will be displaced. The bump is proportioned so that just that amount of adhesive which is required to accomplish sealing will be displaced. Since the bump during assembly primarliy acts to displace the flowable adhesive towards the apex of the wedging element the groove tends to be filled with adhesive. In the preferred embodiment the case halves are constructed of transparent material. It is possible to view the groove through the case half after the device has been fully assembled. If the groove is full of adhesive, this provides a rapid visual check that the proper amount of adhesive was present to accomplish the desired sealing. If the groove is not filled with adhesive this is a visual indication that not enough adhesive was present and that the unit may therefore be defective.

The last pleat or end flap of the membrane extends over the outer edges of the wedging element on the blood side. The length of the flap is trimmed so that the outer edge falls within the valley or trough. The body of adhesive within the trough then serves to encapsulate the edge. This body of adhesive in the valley provides a positive seal between the blood and dialysate sides. This body of adhesive may also be visually inspected through the case half after the device has been fully assembled.

The groove serves a number of functions. In addition to acting as a guiding groove for the scraper which quantitates the adhesive in the valley, it also serves as a sink for excessive adhesive, a visual quality assurance check and a positive seal between the case halves and the wedges.

Dialysis occurs when blood flows on one side of the semipermeable membrane and dialysate flows counter current to the blood on the opposite side of the semipermeable membrane. In order to maximize the surface area of the membrane in the smallest volume, the membrane is pleated with each pleat defining a blood flow channel and cooperating dialysate flow channels.

The dialysate is supplied to and withdrawn from the stack through dialysate plenums on the dialysate side of the case. Blood is supplied to and withdrawn from the stack through blood plenums which are on the blood side of the case. The plenums serve to distribute fluid across the stack so that all of the blood and dialysate flow channels are utilized. The blood plenums are relatively smaller than the dialysate plenums and are offset outwardly somewhat from the dialysate plenums. The offsetting of the blood plenums accomplishes two things. It laterally aligns the outer edges of the plenums and tends to extend the blood flow pattern axially outwardly somewhat so that the full length of the stack is utilized. The size of the blood plenums is reduced as compared with the dialysate plenums so as to avoid areas of stagnation and areas in which excessive pressure drops might occur and thus avoid damaging the blood.

Interlocking tabs and grooves are provided in the coangular sides of the case and wedging elements. These locking tabs and grooves engage when the case halves are brought together along the parting line so as to prevent separation or lateral displacement of the case halves.

The dialyzer stack in the completed device is in substance a series of parallel plates stacked one adjacent to another with separater material in the dialysate channels, and nothing in the blood channels. Each of the separate channels is sealed on all three of its open edges except at the area of the plenum which supplies fluid and in the area of the plenum which withdraws the fluid. Two of the open sides of each of dialysate channels is sealed with adhesive and the third is sealed with a resiliant closed-pore elastomeric foam material which serves as a gasket.

The ends of the stack are sealed by injecting adhesive into the ends of the case after the case has been assembled together with the stack. The initially flowable adhesive permeates the stack up to the outer edges of the respective plenums so as to effectively seal the blood and dialysate channels and prevent the passage of fluid around the edge of the membrane from the blood side to the dialysate side.

On the blood side of the case the inside of the case which is adjacent to the open sides of the blood channels is coated with an initially flowable adhesive. When the blood side of the case is assembled to the stack the previously applied adhesive contacts the blood side of the stack, flows slightly into the blood channels and seals them. This adhesive serves to prevent the blood from shunting from the inlet blood plenum to the outlet blood plenum without passing through the blood channels. Also, this blood side adhesive shunt block prevents blood from changing channels as it flows through the stack between the plenums.

All of the initially flowable adhesive in the dialyser is cured in situ to a solid phase state so as to seal the dialyser and hold it together in a desired assembled configuration.

It is essential that the plenum areas be open across the full width of the stack so that blood and dialysate will flow freely into and out of all of the channels. In this way, the full design area of the membrane is available during usage. Adhesive is prevented from flowing into the plenum areas by the presence of adhesive dams at the edges of the plenum in contact with the stack. Beads of semi-curing adhesive are placed at the edge of the plenums in such a location that they extend the full length of the plenum transversely to the longitudinal axis of the case. These beads are positioned on each plenum edge and assume the form of a half-round bead. These beads at least prior to assembly, are not cured to a hard state. They are still slightly deformable at the time of assembly so as to conform somewhat to the stack. The presence of these beads at the outer edges of the respective plenums limit the travel of the end injected adhesive so that it does not flow into the plenum areas. The presence of these beads on the respective inner edges of the blood plenums prevents the adhesive on the blood plenum case wall from flowing into the plenum areas after assembly. The presence of the adhesive beads on the dialysate side, in cooperation with the solid body of foam which is positioned there, aids in preventing the shunting of dialysate between the plenums outside of the dialysate channels.

The configurations of the coangular wedge element and case side surfaces, as described hereinabove, accurately quantifies the amount of adhesive on the sides of the case in the plenum area. This prevents the flow of excessive adhesive from the coangular surfaces into the outermost channels in the plenum areas. The very accurate quantitifying of the adhesive at the conangular surfaces so as to prevent adhesive from blocking the first few blood or dialysate channels while achieving reliable sealing very materially improves the consistency of the operating characteristics which are obtained between mass-produced units.

The dialysate side of the stack is not sealed with adhesive. This side is embedded in a solid body of highly resilient partially or completely closed cell foam. This material permits resilient accomodation of variations in the stack while maintaining a good seal. This foam, preferably together with the adhesive bead dams as described hereinabove, serves to prevent the shunting of dialysate from one plenum to another and from one dialysate channel to another. The foam for this shunt blocking purpose on the dialysate side should be selected so that it is highly resistant to liquid flow, as resilient as possible and possessed of good memory characteristics. This material must maintain its resiliency when wet with dialysate so that it will follow and maintain contact with the separator portion of the stack should it shift slightly in use. In addition to being resilient and mostly closed cell the foam must of course be biologically compatible with dialysate and human blood.

The use of foam instead of adhesive to seal the open third side of the dialysate channels contributes significantly to the reliability and manufacturability of the device, particularly when considered with the other features and advantages described herein. The use of foam in the construction of hemodialyzers has been previously proposed, see for example, Col. 11 of Markley U.S. Pat. No. 3,864,265, issued Feb. 4, 1975. The usage of foam permits the membrane to shift slightly when pressure is applied to it so as to adjust and absorb various stresses and strains without rupturing or developing a shunt condition. The resiliency of the foam also permits greater manufacturing tolerances without impairing the dialysate shunt preventing functions of the device. Even substantial variations due to an accumulation of stack height tolerances and case half height tolerances may be accomodated without impairing or significantly altering the characteristics of the device.

The semipermeable membrane, which is preferably a cellulosic membrane, is preferably co-folded with a separater material. Various separater materials are conventional and well known in the art. Conventional separater materials include non-woven mesh materials. Preferably a sheet of separater material is pleated together with a sheet of membrane. The resultant structure has a double layer of separater material in each dialysate channel. The presence of a double separater material in each dialysate channel insures that there will be sufficient space in the channel to permit the free flow of fluid even should an operating condition occur where bubbles tend to come out of the dialysate in the dialysate channels. The presence of a double separater provides enough space so that bubbles are flushed out and do not contribute to the blockage of channels. The free flow of dialysate through the channels minimizes the pressure drop which occurs across the device on the dialysate side. The use of double separater material in parallel plate hemodialyzers, apart from the other advantages and features described herein, has been previously proposed.

The dimensional stability of the configuration of the case halves during assembly and curing is important in achieving consistant reproducable characteristics between mass-produced units. The dimensional stability of the case halves is materially improved by the provision of the transversely extending ribs on the exterior surfaces of the bases of the case halves. The transversely extending ribs or beams also serve as guides for mounting the unit to dialysate delivery machines at the site of use. The exterior surface of the case half base is also preferably rough textured so as to facilitate the clamping and handling of the device both during production and in use.

The accompanying drawings are submitted for the purposes of illustration only and not limitation. Referring particularly to the drawings there is illustrated:

FIG. 1, a top plan view of one embodiment of a hemodialyzer device according to the present invention;

FIG. 2, a front elevational view of the embodiment shown in FIG. 1;

FIG. 3, an end elevational view of the embodiment illustrated in FIG. 1;

FIG. 4, an enlarged partial cross-sectional view taken along line 4—4 in FIG. 2;

FIG. 5, a partial cross-sectional view taken along line 5—5 in FIG. 2;

FIG. 6, a partial cross-sectional view taken along line 6—6 of FIG. 1, showing the assembled case without the stack of membrane; and FIG. 7, an exploded perspective view of the embodiment illustrated in FIG. 1.

Referring particularly to the drawings there is indicated generally at 10 a hemodialyzer. The hemodialyzer comprises a case or shell which includes a blood side case half 12 and a dialysate side case half 14. Disposed within the respective case halves are first wedge element 16 and second wedge element 18. The base walls of the respective case halves and the base walls of the respective wedge elements define therebetween a generally rectangular cavity. The case halves are generally symmetrical and separable along parting line 19. A stack of dialyzing membrane 21 is positioned within the rectangular cavity defined by the respective case halves and wedge elements. A foam shunt block 20 is positioned between the base wall of dialysate case half 14 and the dialysate side of stack 21. Stack 21 includes a folded semipermeable membrane 22 which is cofolded with a dialysate permeable support member 24. An initially flowable cured in situ body of adhesive forms adhesive shunt 26 between the base wall of blood side case half 12 and the blood side of stack 21. Adhesive bead dams 28 are positioned so as to project outwardly from blood side case half 12 at the edges of the blood plenums. The adhesive bead dams 28 are positioned at and parallel with the edges of the blood plenums 32 and 34. Adhesive bead dams 30 are positioned on the dialysate case half 14 at the edges of dialysate plenums 36 and 38. The respective ends of the stack are injected with initially flowable adhesive to form adhesive end blocks 31. The respective adhesive bead dams on the outer edges of plenums 32 and 36 serve to block the flow of the adhesive from the adhesive end blocks 31 so that it does not enter the plenum areas. Likewise, the outermost adhesive bead dams for plenums 34 and 38 serve to prevent adhesive from the adhesive end blocks at the other end of the device from flowing into those plenums. Blood plenums 32 and 34 on the blood side of the hemodialyzer open into blood channels 40 and dialysate plenums 36 and 38 open into dialysate channels 42 on the dialysate side of the hemodialyzer. The blood side of stack 21 is sealed to the case by adhesive shunt 26. The dialysate side of stack 21 is sealed to the case by a foam shunt block 20 which is not adhered to the stack. The ends of stack 21 are sealed by adhesive end blocks 31. The pleats tend to embed themselves in the resilient elastomeric beads 20. The last pleat of membrane 22 is carried over the rounded blunt outer end of wedge elements 16 and 18 respectively, on the blood side. The last pleat forms an end flap 44 which extends between first wedge element 16 and the coangular side of blood side case half 21. The last pleat of membrane 22 on the opposite side of stack 21 (not shown) forms a similar end flap which extends between the wedgedly coacting surfaces of second wedge element 18 and the coangular side of blood side case half 12. The edge of end flap 44 is shown at 46.

The angularly extending sides of the respective wedge elements are contoured to aid in quantifying and properly positioning the initially flowable adhesive in this area. The contours of the sides of each wedge element are symmetrical about the apex of the wedge element. Typical details of a wedge element include assembly knobs 48 which provide contact points for an assembly clamp. Knobs 48 are adjacent to the apex of the wedge element on the blood side. The parting line between the two case halves is located at the apex of the wedge elements. The contours of the wedge element include a blood side guiding groove 52 and a blood side valley 54. On the dialysate side of the wedge element there is the dialysate side guiding groove 56 and the dialysate side valley 58. Symmetrically disposed about the apex of the wedge element are blood side locking tabs 60 and dialysate side locking tabs 62. Notches 64 are provided in blood side case half 12 so as to accomodate assembly knobs 48. Notches 64 permit the blood side case half to be fully assembled by unclamping the assembly clamps from their contact with assembly knobs 48 with the blood side case half in place. Bumps 66 extend axially throughout the length of the angularly projecting sides of the respective case halves. Bumps 66 are positioned so that in the fully assembled form they are received in the valleys 54 and 58 so as to displace a predetermined portion but not all of the adhesive from these valleys. The end flaps are trimmed to such a length that their edges 46 are located within the blood side valleys 54 and are encapsulated in the body of the adhesive which is located there. This encapsulation seals the last pleat on either side of the stack 21 so as to prevent the passage of blood around the edge of this pleat.

Locking grooves 68 are located in the angularly extending sides of blood side case half 12. Locking grooves 68 are positioned so as to engage locking tabs 60 when blood side case half 12 is brought into assembled configuration with the respective wedging elements. Likewise, when dialysate case half 14 is brought into assembled configuration with the respective wedging elements, the dialysate side locking tabs 62 engage with the dialysate side locking grooves 70. The interengagement of the locking tabs with the locking grooves serves to hold the dialyzer in assembled configuration along the parting line. The locking tabs and locking grooves are of about the same length so that in the assembled configuration they prevent the lateral shifting of the case halves relative to one another and the wedge elements.

The respective case halves are reinforced by reinforcement beams or ribs 72 and 74, respectively, so as to strengthen the case or shell during assembly and curing. Strengthening the case prevents it from being distorted so as to stress the membrane or tear it. Also distortion may shift the elements of the device so as to change its characteristics or render it inoperable.

The assembly of the device is accomplished using biocompatible materials by first pleating membrane 22 and support member 24 together so as to form stack 21. Stack 21 is then placed between wedge elements 16 and 18 and an assembly clamping fixture is clamped onto assembly knobs 48 so as to compress and hold stack 21. The end flaps 44 are trimmed so that their edges 46 fall in valleys 54. Adhesive beads are then placed in valleys 54 and 58 and a scraper device, guided by grooves 56 and 52, is utilized to level the adhesive in the valleys and to remove the excess. The quantity of adhesive in this area is thus easily and accurately controlled. A blood side case half 12 is selected and adhesive bead dams 28 are applied to the edges of plenums 32 and 34. Flowable adhesive is applied to the interior side of the base wall of case half 12 between the innermost adhesive bead dams 28. This adhesive will form adhesive shunt 26 in the completed device. A dialysate side case half 14 is selected and adhesive bead dams 30 are applied to the edges of dialysate plenums 36 and 38. A foam shunt block 20 is positioned on the inner surface of the base wall of dialysate side case half 14 between the innermost adhesive bead dams 30. The case halves are then assembled together along parting line 19 in cooperation with the wedge elements. The bumps 66 act to displace a predetermined amount of adhesive from the valleys. This displaced adhesive is displaced towards the apex and provides sealing in that area. The valley and bump act together as an accurate adhesive dispensing system for the adhesive which is required in the apex area. The body of adhesive which is left in the valley has a predetermined thickness which is sufficient to provide positive encapsulation for the edge 46 of the membrane. Adhesive is injected into the ends of the assembled dialyzer to form adhesive end blocks 31. The outermost adhesive dams prevent the injected adhesive from flowing into the plenums. The completed dialyzer is then allowed to cure and is sterilized. The dialyzer may be clamped so as to prevent the case halves from separating during the injection of adhesive at the ends and during cure, if desired. The cured device is inspected visually to determine whether the valleys and grooves are filled with adhesive. The absence of adhesive indicates that the unit may be defective and should be discarded.

What has been described are preferred embodiments in which modifications and changes may be made without departing from the spirit and scope of the accompanying claims.

What is claimed is:

1. A hemodialyzer comprising:
a substantially rigid case having blood ports and dialysate ports and including a shell member and at least one generally triangular shaped wedge element assembled together, said shell member being divided along a parting line into two parts, each of said two parts having a generally trapezoidal cross-sectional configuration, an obtuse apex of said triangular shaped wedge element being positioned at about said parting line, the inner walls of said shell member and wedge element together defining a generally rectangular cavity, said shell member and said wedge element having wedgedly coacting surfaces, said shell member and said wedge element being separately preformed prior to being assembled; and
a semipermeable membrane folded in a plurality of pleats and confined within said cavity, a last pleat of said membrane extending over an acute apex of said triangular shaped wedge element and between said coacting surfaces terminating short of said parting line in an edge which extends generally parallel to said parting line, said coacting surfaces including contour means for permitting accurate quantifying and placement of a body of an initially flowable adhesive between said coacting surfaces during assembly, said contour means being spaced from said parting line, said edge being received by a cavity in said contour means in position to be encapsulated and sealed by said adhesive, said wedge element including clamp receiving means positioned on one of said wedgedly coacting surfaces between said obtuse apex and said first acute apex for permitting the clamping of said wedge element in an assembly clamping fixture during the assembly of said device and in the fully assembled form.

2. A hemodialyzer of claim 1 wherein said shell member includes reinforcement means for preventing the distortion of said shell member during assembly with said wedge element and semipermeable membrane.

3. A hemodialyzer of claim 1, wherein at least a portion of the exterior of said shell member is textured to facilitate holding.

4. A hemodialyzer comprising:
a substantially rigid case including a preformed shell member, at least one preformed generally triangular shaped wedge element, and a stack of dialyzing membrane, said shell member having blood ports and dialysate ports therein and being divided along a parting line into two parts, each of said two parts having a generally trapezoidal cross-sectional configuration, one of said parts being on a blood side of said hemodialyzer and the other of said parts being on a dialysate side of said hemodialyzer, an obtuse apex of said generally triangular shaped wedge element being positioned at about said parting line, said wedge element being generally symmetrical about said obtuse apex and extending generally perpendicular to said parting line, the inner walls of said shell member and said wedge element together defining a generally rectangular cavity for receiving said stack of dialyzing membrane, said shell member and wedge element having wedgedly coacting surfaces adapted to wedgedly coact to restrain said stack in an assembled form when said two parts are brought together along said parting line, one of said wedgedly coacting surfaces on said wedge element including clamp accommodating means for contact with an assembly clamping fixture to hold said stack of dialyzing membrane and wedge elements during assembly, said clamp accommodating means being positioned to permit clamping adjacent to said parting line of said blood side and being accessible to said assembly clamping fixture when said hemodialyzer is in said assembled form, said coacting surfaces including contour means spaced from said parting line for permitting accurate quantifying and placement of a body of initially flowable adhesive in a cavity between said coacting surfaces, said contour means being at least on said blood side, said stack on said dialysate side being sealed to said shell member in at least one area by contact with a gasket member, said gasket member including a solid body of non-adhesive resilient elastomeric material.

5. A hemodialyzer of claim 4 wherein said semipermeable membrane is cofolded in a plurality of pleats with a dialysate permeable separator means.

6. A hemodialyzer of claim 5 wherein said folded semipermeable membrane is sealed to said shell member on said dialysate side in at least one area by embedment in initially flowable cured in situ adhesive and dam means are provided for preventing said adhesive from flowing into and blocking said ports.

7. A device comprising:
a substantially rigid case including a preformed shell member having inlet and outlet ports and at least one preformed generally triangular shaped wedge element, said shell member being divided along a parting line into two parts, said shell member being approximately symmetrical about said parting line, an obtuse apex of said triangular shaped wedge element being positioned at about said parting line, the inner walls of said shell member and said wedge element together defining a generally rectangular cavity, said shell member and said wedge element being generally coangularly extending wedgedly coacting surfaces; and a semipermeable membrane folded in a plurality of pleats and confined within said cavity, a last pleat of said membrane extending over a first acute apex of said triangular shaped wedge element and between said coacting surfaces terminating short of said parting line in an edge which extends generally parallel to said parting line, said wedge element including clamp receiving means for permitting the clamping of said wedge element in an assembly clamping fixture during the assembly of said device, said clamp receiving means being accessible to said assembly clamping fixture while said device is being assembled and in the fully assembled form, said clamp receiving means being positioned on one of said wedgedly coacting surfaces between said obtuse apex and said first acute apex.

8. A device comprising:
a substantially rigid case including a preformed shell member having inlet and outlet ports and at least one preformed generally triangular shaped wedge element, said shell member being divided along a parting line into two parts, said shell member being approximately symmetrical about said parting line, an obtuse apex of said triangular shaped wedge element being positioned at about said parting line, the inner walls of said shell member and said wedge element together defining a generally rectangular cavity, said shell member and said wedge element having two pairs of generally coangularly extending wedgedly coacting surfaces; and a semipermeable membrane folded in a plurality of pleats and confined within said cavity, a last pleat of said membrane extending over an acute apex of said triangular shaped wedge element and between a first pair of said coacting surfaces terminating short of said parting line in an edge which extends generally parallel to said parting line, one of said first pair of coacting surfaces including a first valley means for receiving said edge and encapsulating the entire length of said edge in a body of initially flowable cured in situ adhesive to seal said edge and first pair of coacting surfaces, said first valley means being spaced from and extending generally parallel to said parting line and extending for at least the entire length of said edge, one of said second pair of coacting surfaces including a second valley means for receiving a body of initially flowable cured in situ adhesive to seal said second pair of coacting surfaces, said second valley means being spaced from and extending generally parallel to said parting line and extending for the entire length of said second coacting surfaces, said first and second valley means being disposed on opposite sides of said parting line, and means associated with each of said first and second valley means for guiding on adhesive scraper along said valley means.

9. A hemodialyzer comprising:

a substantially rigid case including a preformed shell member and at least one preformed generally triangular shaped wedge element, said shell member having blood ports and dialysate ports therein and being divided along a parting line into two parts, at least one of said two parts having a generally trapezoidal cross-sectional configuration, said wedge element extending generally perpendicular to said parting line, an obtuse apex of said generally triangular shaped wedge element being positioned at about said parting line, the inner walls of said shell member and said wedge element together defining a generally rectangular cavity adapted to receive a stack of dialyzing membrane, said shell member and wedge element having two pairs of longitudinally extending wedgedly coacting surfaces having longitudinally extending edges, said surfaces being adapted to wedgedly coact to restrain said stack in an assembled form when said two parts are brought together along said parting line, a first of said surfaces on said wedge element including a valley means spaced from and extending generally parallel to said parting line throughout the length of said first surface and adapted for receiving therein the edge of the end of said dialyzing membrane and a body of initially flowable cured in situ adhesive, a second set of said surfaces on said wedge element including a valley means spaced from and extending generally parallel to said parting line throughout the length of said second surface and adapted to receive therein a body of initially flowable cured in situ adhesive, said first and second surfaces extending on opposite sides of said obtuse apex intermediate said longitudinally extending edges.

10. A hemodialyzer of claim 9 wherein at least one surface on said shell member which is adapted to wedgedly coact includes a protrusion means for receipt in said assembled form in one of said valley means, said protrusion means being substantially coextensive with said one valley means and adapted to being received therein, and to displace a portion of but less than all of said body of adhesive from said one valley means.

11. A hemodialyzer of claim 9 wherein said wedge element includes clamp accommodating means for contact with an assembly clamping fixture to hold said stack of dialyzing membrane and wedge element in place during assembly with at least one of said two parts of said shell member.

* * * * *